US007100155B1

(12) United States Patent
Wu

(10) Patent No.: US 7,100,155 B1
(45) Date of Patent: Aug. 29, 2006

(54) SOFTWARE SET-VALUE PROFILING AND CODE REUSE

(75) Inventor: Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/522,510

(22) Filed: Mar. 10, 2000

(51) Int. Cl.
*G06F 9/45* (2006.01)
*G06F 9/44* (2006.01)

(52) U.S. Cl. ...................... 717/158; 717/130

(58) Field of Classification Search ............... 717/127, 717/130–132, 140, 151–158, 145, 159
See application file for complete search history.

(56) References Cited

U.S. PATENT DOCUMENTS

| | | | | |
|---|---|---|---|---|
| 5,355,487 A | * | 10/1994 | Keller et al. | 717/127 |
| 5,845,101 A | | 12/1998 | Johnson et al. | 395/383 |
| 5,845,103 A | | 12/1998 | Sodani et al. | 395/392 |
| 5,909,578 A | * | 6/1999 | Buzbee | 717/130 |
| 5,933,628 A | * | 8/1999 | Chang | 712/233 |
| 5,960,198 A | * | 9/1999 | Roediger et al. | 717/130 |
| 6,253,373 B1 | * | 6/2001 | Peri | 717/150 |
| 6,389,468 B1 | * | 5/2002 | Muller et al. | 709/226 |
| 6,427,234 B1 | * | 7/2002 | Chambers et al. | 717/140 |

OTHER PUBLICATIONS

Wu et al., "Better Exploration of Region-Level Value Locality with Integrated Computation Reuse and Value Prediction", IEEE, 2001, 98-108.*
Watterson et al., "Goal-Directed Value Profiling", Springer-Verlag Berlin Heidelberg, 2001, pp. 319-333.*
Sastry et al., "Characterizing Coarse-Grained Reuse of Computation", University of Wisconsin, Madison.*
Sodani et al., "Dynamic Instruction Reuse", ACM, 1997.*
Hall, "Call Path Profiling", ACM, 1992, pp. 296-306.*
Calder et al., "Value Profiling and Optimization", Journal of Instruction-Level Parallelism 1, 1999.*
Connors et al., "Compiler-Directed Dynamic Computation Reuse: Rationale and Initial Results", IEEE, 1999, pp. 158-169. *Retransmitted for page numbered copy.*
"Dictionary of Computing", Oxford University Press, Market House Books, 1996.*
Molina et al., "Dynamic Removal of Redundant Computations", Internatinal Conference on Supercomputing, 1999.*
Lilja et al., "Exploiting Basic Block Value Locality with Block Reuse", 1998.*
Gonzalez et al., "Trace-Level Reuse", 1999.*

(Continued)

*Primary Examiner*—Kakali Chaki
*Assistant Examiner*—William H. Wood
(74) *Attorney, Agent, or Firm*—Schwegman, Lundberg, Woessner & Kluth, P.A.

(57) ABSTRACT

An apparatus and method for profiling candidate reuse regions and candidate load instructions aids in the selection of computation reuse regions and computation reuse instructions with good reuse qualities. Registers holding input values for candidate reuse regions are sampled periodically when the candidate reuse region is encountered. The register contents are combined into set-values. When a relatively small number of set-values account for a large percentage of occurrences, the candidate reuse region may be a good computation reuse region. Load instructions are profiled for the location accessed and the value loaded. The location and value are combined into location-values. The relative occurrence frequency of location-values can be used to evaluate load instructions as candidate instructions for reuse.

33 Claims, 6 Drawing Sheets

OTHER PUBLICATIONS

Lipasti et al., "Value Locality and Load Value Prediction", Oct. 1996.*

Feller et al.; "Value Profiling"; IEEE, 1997; pp. 259-269.*

Calder, B., et al., "Value Profiling", *IEEE, Proceedings of Micro-30*, 11 pgs., (Dec. 1-3, 1997).

Connors, D.A., et al., "Compiler-Directed Dynamic Computation Reuse: Rationale and Initial Results", *Proceedings of the 32nd Annual International Symposium on Microarchitecture (MICRO)*, 12 pgs., (Nov. 1999).

Gallagher, D.M., et al., "Dynamic Memory Disambiguation Using the Memory Conflict Buffer", *ASPOLS-VI Proceedings, vol. 29*, 183-193, (Nov. 1994).

Steffan, J.G., et al., "Architectural Support for Thread-Level Data Speculation", *Computer Science Technical Report*, Computer Science Department School of Computer Science, Carnegie Mellon University, CMU-CS-97-188, 1-41, (Nov. 1997).

Steffan, J.G., et al., "The Potential for Using Thread-Level Data Speculation to Facilitate Automatic Parallelization", *HPCA-4*, 1-12, (Feb. 1-4, 1998).

Tsia, J., et al., "The Superthreaded Processor Architecture", 1-40.

Vijaykumar, T.N., et al., "Task Selection for a Multiscalar Processor", *31st International Symposium on Microarchitecture*, 12 pgs., (Dec. 1998).

* cited by examiner

| 202 | 204 | 206 | 208 |
|---|---|---|---|
| r1 | r2 | r3 | r1 r2 r3 |
| V11 | V21 | V31 | V11 V21 V31 |
| V12 | V22 | V32 | V11 V22 V32 |
| V13 | V23 | V33 | V12 V22 V33 |
| V14 | V24 | | V13 V23 V33 |
| | V25 | | V14 V24 V33 |
| | | | V14 V25 V33 |

FIG. 2

| 102 | r1 r2 r3 |
|---|---|
| 104 | r4=r1+r2 |
| 106 | r5=r4+r3 |
| | ... |
| 108 | r7=r1*r2 |

FIG. 1

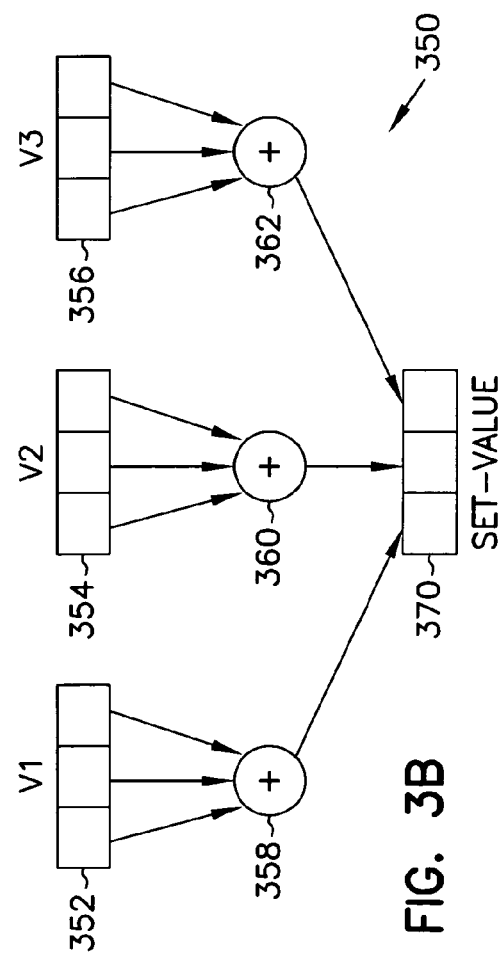
FIG. 4
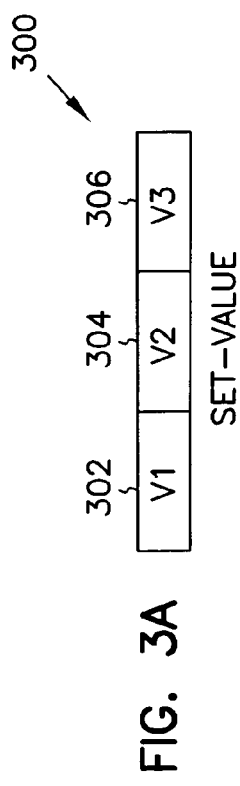
FIG. 3A
FIG. 3B

522~pt,pf=compare.eq counter, 0
524~<pf> counter=counter-1
526~<pt> counter=S
528~<pt> value_profile($V_1$)

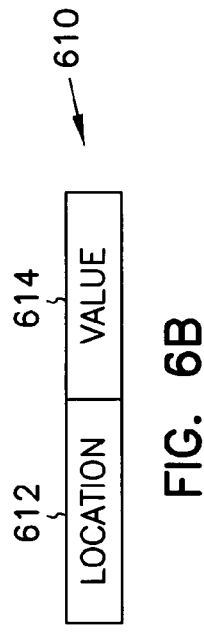
```
602~ x=0
604~ FOR i=1 TO M
606~ x=x+a[i]
608~ END FOR
```
FIG. 6A
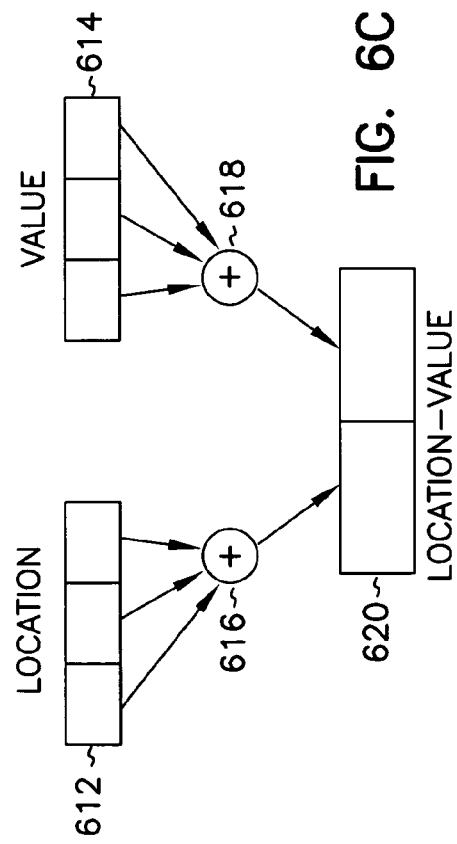
FIG. 6B
FIG. 6C
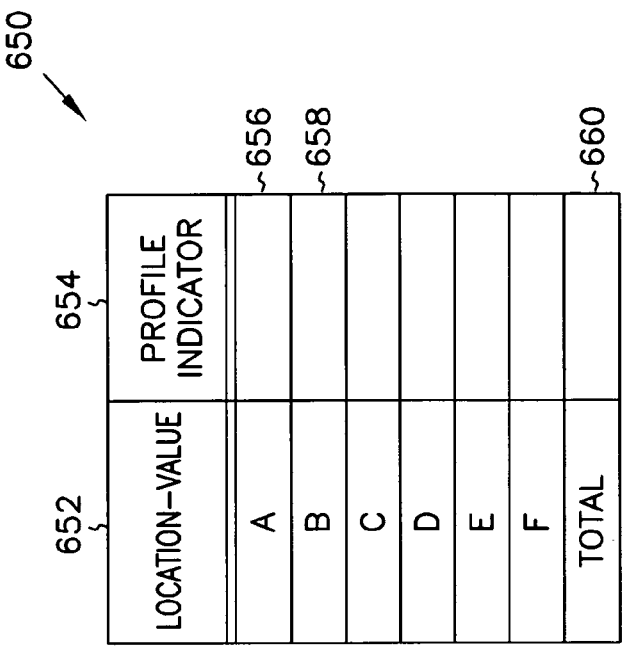
FIG. 6D

SOFTWARE SET-VALUE PROFILING AND CODE REUSE

FIELD

The present invention relates generally to software, and more specifically to software capable of reusing regions of code.

BACKGROUND OF THE INVENTION

Modern software programs include many instructions that are executed multiple times each time the program is executed. Typically, large programs have logical "regions" of instructions, each of which may be executed many times. When a region is one that is executed more than once, and the results produced by the region are the same for more than one execution, the region is a candidate for "reuse." The term "reuse" refers to the reusing of results from a previous execution of the region.

For example, a computation reuse region could be a region of software instructions that, when executed, read a first set of registers and modify a second set of registers. The data values in the first set of registers are the "inputs" to the computation reuse region, and the data values deposited into the second set of registers are the "results" of the computation reuse region. A buffer holding inputs and results can be maintained for the region. Each entry in the buffer is termed an "instance." When the region is encountered during execution of the program, the buffer is consulted and if an instance with matching input values is found, the results can be used without having to execute the software instructions in the computation reuse region. When reusing the results is faster than executing the software instructions in the region, performance improves. Such a buffer is described in: Daniel Connors & Wen-mei Hwu, "Compiler-Directed Dynamic Computation Reuse: Rationale and Initial Results," Proceedings of the 32nd Annual International Symposium on Microarchitecture (MICRO), November 1999.

Some regions make better candidates for reuse than others. For example, a region capable of producing an often-reused instance is a good candidate for reuse. In contrast, regions that produce instances that are not reused often generally do not make good candidates for reuse, in part because new instances are frequently generated, and buffered instances are not often reused. Regions that are candidates for reuse are typically identified when the program is compiled. The compiler identifies candidates for reuse, and selects which candidates are to be computation reuse regions after the program is compiled. This can be a difficult problem, in part because the compiler does not necessarily have information describing whether candidate regions have the qualities that make for good reuse regions.

Some compilers use value profiling algorithms in an attempt to identify variables with invariant behavior. One such value profiling algorithm is discussed in: Brad Calder, Peter Feller & Alan Eustace, "Value Profiling," Proceedings of the 30th Annual International Symposium on Microarchitecture (MICRO), December 1997. Calder et al. present a technique that attempts to identify variables with invariant behavior by observing each variable accessed by instructions. Calder et al. also present a technique that observes each variable for a period of time and then tests for convergence. This approach can incur significant overhead, in part because every value generated by every instruction is profiled. Value profiling as described by Calder et al. is not directly applicable to the identification of reuse regions, in part because regions often have inputs and outputs that include multiple variables.

For the reasons stated above, and for other reasons stated below which will become apparent to those skilled in the art upon reading and understanding the present specification, there is a need in the art for an alternate method and apparatus for identifying and profiling candidate reuse regions.

BRIEF DESCRIPTION OF THE DRAWINGS

FIG. 1 shows a candidate reuse region;

FIG. 2 shows input values and set-values for the candidate reuse region of FIG. 1;

FIG. 3A shows a set-value in accordance with one embodiment of the invention;

FIG. 3B shows a set-value in accordance with another embodiment of the invention;

FIG. 4 shows a profiling data structure;

FIG. 6A shows software instructions that access an array;

FIG. 6B shows a location-value in accordance with one embodiment of the present invention;

FIG. 6C shows a location-value in accordance with another embodiment of the present invention;

FIG. 6D shows a location-value profiling data structure;

DESCRIPTION OF EMBODIMENTS

Figures 5A, 5B:
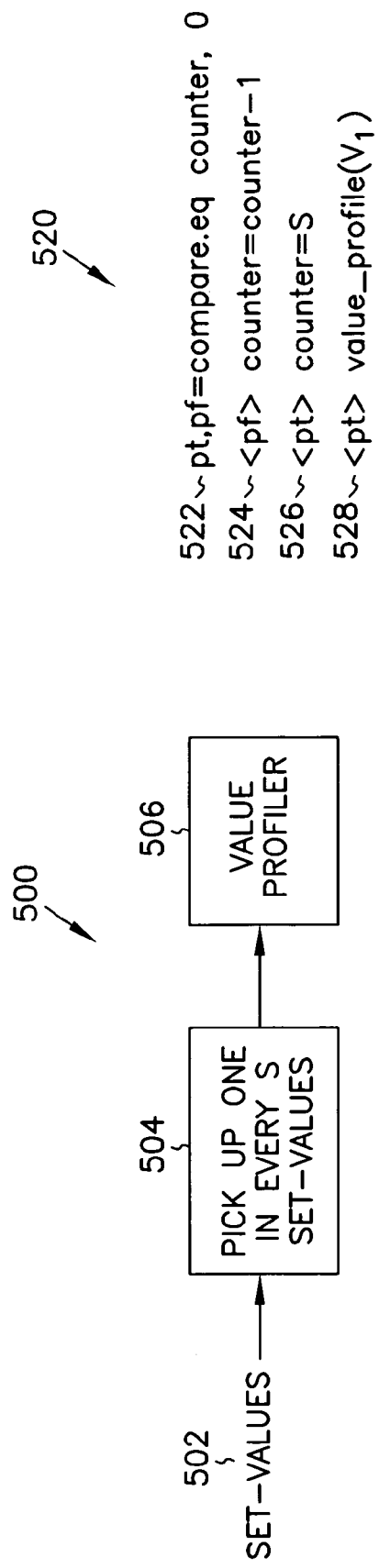
FIG. 5A shows a sampling value profiler.
FIG. 5B shows instrumenting code that implements the sampling value profiler of FIG. 5A.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a profiling mechanism useful for forming computation reuse regions from a list of candidate reuse regions. A computation reuse region has a number of input registers. Values held in the input registers are input values to the region when the region is executed. When the input registers for a candidate reuse region only take on a few sets of different values, the candidate reuse region can be profitably reused. Each set of different values, hereinafter referred to as "set-values," corresponds generally to a reuse instance that will be generated at runtime. Candidate reuse regions exhibiting this behavior can be profitably reused, in part because a small number of instances can be reused often.

The profiling mechanism described herein is also applicable for selecting load instructions for reuse. Some instructions load values from different addresses. Each value loaded from each location is referred to as a "location-value." When a load instruction consistently accesses a small number of location-values, the load instruction may be profitably included within a reuse region. The profiling mechanism described herein can be used to profile location-values in a manner similar to that used for profiling set-values as described above. From the profile for location-values, an estimate can be generated for the likelihood that load values will be overwritten by stores.

FIG. 1 shows a candidate reuse region. A candidate reuse region is a region that can be made into a computation reuse region, but may or may not be a "good" computation reuse region. For the purposes of this description, a good computation reuse region is one which produces instances that are reused often.

Candidate reuse region 100 is shown having multiple instructions, including instructions 104, 106, and 108. Instructions 104 and 108 have registers one and two (r1 and r2) as operands. Likewise, instruction 106 has registers three and four (r3 and r4) as operands. Input registers 102 are shown above candidate reuse region 100 to show that registers r1, r2, and r3 are inputs to the region.

Candidate reuse region 100 has registers 102 as input registers because the first two instructions (instructions 104 and 106) depend upon values held in the input registers, and the input register values are undisturbed before being used within the region. Regions with small numbers of inputs and outputs are selected as candidate reuse regions.

A candidate reuse region 100 can also include loop constructs. Software loops can be identified as candidate reuse regions when they have small numbers of input and output registers. For ease of explanation, candidate reuse region 100 is not shown as a loop, but rather is shown as a linear sequence of instructions. Input registers 102 are the "input set" to candidate reuse region 100.

FIG. 2 shows individual input values and set-values for the candidate reuse region of FIG. 1. Table 200 shows top-values for input register r1 in column 202, top-values for input register r2 in column 204, and top-values for input register r3 in column 206. The term "top-values" as used herein refers to values that occur most frequently. For example, in table 200, value v11 occurs most frequently in input register r1 at the beginning of candidate reuse region 100. Likewise, value v21 occurs most frequently in input register r2, and value v31 occurs most frequently in input register r3. Each of columns 202, 204, and 206 show individual top-values for each of input registers r1, r2, and r3 at the beginning of candidate reuse region 100.

Column 208 shows top set-values for the input set. In this example, the input set consists of input registers 102 (FIG. 1). As can be seen in column 208, the top set-value corresponds to the combination of individual values for each input register. For example, the top set-value corresponds to a value of v11 in input register r1, a value of v21 in input register r2, and a value of v31 in input register r3. As can also be seen in column 208, the next most frequently occurring top set-value includes a mix of individual top-values. For example, the next most frequently occurring top set-value corresponds to a value of v11 in input register r1, a value of v22 in input register r2, and a value of v33 in input register r3.

As previously described, if a small number of top set-values account for a majority of the set-values at the beginning of a candidate reuse region, the candidate reuse region is a good choice for forming a computation reuse region. Individual top-values, such as those shown in columns 202, 204, and 206 do not map directly to top set-values as shown in column 208. The method and apparatus of the present invention directly profiles top set-values such as those shown in column 208. As a result, candidate reuse regions, such as candidate reuse region 100 (FIG. 1) can be selected as computation reuse regions when profitable.

FIG. 3A shows a set-value in accordance with one embodiment of the invention. Set-value 300 includes three values that correspond to values in three input registers to a candidate reuse region. V1 302, v2 304, and v3 306 are concatenated to produce set-value 300. Set-value 300, as shown in FIG. 3A, does not include register names because register names can be inferred from the relative placement of values 302, 304, and 306.

The size of set-value 300 is equal to the sum of the sizes of values 302, 304, and 306. As the number of input registers increases, the size of set-value 300 also increases. As the size of set-value 300 increases, the storage requirements for profiling a large number of candidate reuse regions can become large.

FIG. 3B shows a set-value in accordance with another embodiment of the invention. Embodiment 350 shows set-value 370 generated as a function of value v1 352, value v2 354, and value v3 356. In embodiment 350, value 352 is shown having three segments. Each segment represents a portion of the total value, such as a single byte in a three byte word. Segments of value 352 are combined, or "folded," using exclusive-or operator 358. Likewise, segments of value v2 are folded using exclusive-or operator 360, and segments of value 356 are folded using exclusive-or operator 362. The output of exclusive-or operators 358, 360, and 362 are concatenated to produce set-value 370. Set-value 370 represents the combination of the values of the input set of a candidate reuse region. Unlike set-value 300 (FIG. 3A), set-value 370 does not necessarily grow in size as the number of values increases. For example, if the number of values increases beyond three, additional exclusive-or operators can be employed to combine the additional values prior to concatenation into set-value 370.

Set-value 370 may not be unique for each possible combination of values 352, 354, and 356. For example, two different combinations of values may produce the same set-value 370. This can decrease the accuracy of the resulting profile generated; however, the degraded accuracy is traded for increased storage efficiency. In practice, most profiled values are small, and the likelihood that two profiled input sets result in the same set-value 370 is small. For example, if each of values 352, 354, and 356 only have non-zero values in the left-most segment, then no data is lost as a result of the exclusive-or folding operations, and each set-value will be unique.

Set-value 370 is shown in FIG. 3B as being generated from values folded using exclusive-or operators. One skilled in the art will understand that other mechanisms exist for folding and combining multiple values into set-value 370. When exclusive-or operators or other mechanisms are employed, multiple values are combined into a single value, shown as set-value 370 in FIG. 3B.

In some embodiments, exclusive-or operators 358 and 360 are implemented in hardware. In some hardware implementations, registers internal to a processor drive exclusive-or circuits that create set-values, such as set-value 370. In other embodiments, exclusive-or operators 358 and 360 are implemented in software. In some software implementations, exclusive-or operators 358 and 360 appear as exclusive-or machine instructions inserted into the software as instrumenting code.

In general, N input values can be combined into a set-value that is less than N input words long. The combining techniques shown in FIGS. 3A and 3B can be utilized together or with other combining mechanisms while still practicing the present invention. For example, a subset of the total number of values can be folded using exclusive-or operators resulting in multiple subset-values, which can then be concatenated as shown in FIG. 3A to form set-values. Once a set-value is created, any suitable value profiling technique can be used to produce profiling information such as that shown and described with reference to FIG. 4 below.

FIG. 4 shows a profiling data structure for a candidate region. Profiling data structure 400 includes top set-values 410 and profile indicators 420 arranged in records, and the total number of set-values 430. Record 422 has a set-value shown as "A," and has a profile indicator value of 800. Likewise, record 424 has a set-value shown as "B," and has a profile indicator value of 400. Set-values 410 are shown in FIG. 4 having alphanumeric values for ease of explanation. In some embodiments, set-values 410 have values that include concatenated register values, such as set-value 300 (FIG. 3A). In other embodiments, set-values 410 have values corresponding to combined register values, such as set-value 370 (FIG. 3B). The total number of set-values 430 is the sum of all the set-values encountered by the profiler at the region entry, including the top set-values and the less frequently encountered set-values.

In the embodiment of FIG. 4, profiling data structure 400 is shown in a state existing after a region has been profiled. Top set-values 410 have been profiled, and profile indicators 420 show how often each of top set-values 410 was encountered. For example, as shown in record 422, top set-value A occurred 800 times. Likewise, as shown in record 424, set-value B occurred 400 times. The total number of set-values 430 is equal to 3000. Five hundred of the 3000 sampled set-values did not match set-values in profiling data structure 400 and were discarded.

During profiling, when a particular set-value is encountered, profiling data structure 400 is accessed as a function of set-values and the corresponding profile indicator is updated. In this example, the profiling indicator is updated using an increment operation. Profiling data structure 400 only keeps a small number of distinct set-values. For example, profiling data structure 400 may include only eight entries.

The relative probability of occurrence of each top set-value 410 is a function of the total number of set-values 430 collected from the region during profiling. For example, the sum of all profile indicators 420 maintained in data structure 400 is equal to 2500. If the input set of the candidate reuse region were sampled a total of 3000 times resulting in profiling data structure 400, the candidate reuse region may be a good candidate for a computation reuse region. The candidate reuse region may be a good computation reuse region in part because the top eight set-values as shown in data structure 400 account for greater than 80 percent (2500/3000>0.8) of all set-values sampled for the candidate reuse region.

If, however, profiling data structure 400 results after sampling the input register set a total of 20000 times, the candidate reuse region may not be a good choice for a computation reuse region. The candidate reuse region may not be a good computation reuse region in part because the top eight values as shown in data structure 400 account for less than 13 percent (2500/20000<0.13) of all set-values sampled for the candidate reuse region.

In some embodiments, the number of top set-values to profile is a decision made prior to profiling the software. The size of profiling data structure 400 is then set accordingly. If a processor that will ultimately execute the computation reuse regions in the end-user environment has the capability to store a large number of computation reuse instances, then the number of top set-values profiled can also be large. In some embodiments, the size of profiling data structure 400 is at least as large as the number of expected reuse instances that will be stored in the end-user environment.

Profiling data structure 400 can be implemented in any suitable type of physical data structure. In some embodiments, data structure 400 is an array sequentially searched by the set-value. In other embodiments, data structure 400 is implemented in a hash table. In still other embodiments, data structure 400 is a dedicated hardware buffer resident within the processor that performs the profiling operations.

FIG. 5A shows a sampling value profiler. As previously described, a good computation reuse region can be selected based on the frequency of occurrence of top set-values. The frequency of occurrence of top set-values can be ascertained by statistically sampling a sufficient number of set-values without sampling every single one. As shown in embodiment 500, value profiler 506 receives one of every "S" set-values from filter 504. Filter 504 receives a set-value 502 each time a candidate reuse region is encountered during profiling, but only passes one of every S set-values to value profiler 506. By sampling every S values, an approximation of the probability of occurrence of top set-values is generated. FIG. 5A shows the sampling mechanism in schematic form. FIG. 5B shows an embodiment of a sampling profiler using pseudo-code.

FIG. 5B shows instrumenting code that implements the sampling value profiler of FIG. 5A. Instrumenting code 520 shows four instructions. In some embodiments, instrumenting code is inserted in a program being profiled at the beginning of a candidate reuse region. Instruction 522 sets one of two predicate registers (see FIG. 8) to "true" and the other to "false" based on the outcome of a "compare" operation. The two predicate registers include a "true" predicate register shown as "pt," and a "false" predicate register shown as "pf." When, in instruction 522, the variable labeled "counter" is equal to zero, the true predicate register is set, and instructions 526 and 528 executed. The execution of instruction 526 results in the counter variable being reinitialized to the sampling interval "S," and the execution of instruction 528 results in a set-value "$V_1$" being profiled using a profiling function labeled "value_profile." Conversely, if the variable labeled "counter" is not equal to zero, the false predicate register is set, and instruction 524 executes. Each time instruction 524 executes, the counter is decremented.

In some embodiments, much of the code shown in FIG. 5B can be shared by multiple candidate regions if it is known that the regions will be entered under the same condition. In other words, if the entries of the regions are control equivalent. For example, instructions 522, 524, and 526 can be placed anywhere prior to control equivalent candidate region entries and candidate load instructions. Instruction 528 can be inserted at each of the control equivalent candidate region entries and candidate load instructions. In these embodiments, instructions 522, 524, and 526 are not repeated for each control equivalent candidate region entry and candidate load instruction. Profiling instructions inserted for profiling each of the control equivalent candidate region entries and candidate load instructions are predicated on the same predicate register.

The value of "S" in FIGS. 5A and 5B is chosen so that a statistically valid number of samples is collected. For example, if a candidate reuse region is encountered one million times, and the top eight set-values are to be profiled, a few hundred samples may be sufficient. In this example, S can be set on the order of ten thousand. On the other hand, if a candidate reuse region is encountered only a few hundred times, a statistically valid number of samples should not be too small, and S can be set smaller accordingly.

In some embodiments, S is set such that a minimum number of samples equal to a multiple of the number of top set-values to be collected during profiling. One such embodiment is shown in the pseudo-code that follows.

S=user selected sampling interval
num_samples=region_entry_freq/S
min_num_samples=K*num_top_set_values
if (num_samples<min_num_samples)
S=region_entry_freq/min_num_samples In the example embodiment shown in pseudo-code above, num_samples is the number of set-value samples to be taken, and is initially computed as the total number of occurrences divided by the initial sample interval, S. A minimum number of samples is computed as K times the number of top set-values to be profiled, and if the number of samples previously computed is less than the minimum, the sample interval S is recomputed to satisfy the criteria. In some embodiments, K is greater than or equal to ten.

Embodiments described thus far are generally directed to set-values that can aid in the identification of good computation reuse regions. The method and apparatus of the present invention can also be utilized for profiling location-values that can aid in the identification of good load and store instructions for inclusion in reuse regions. In general, for computation reuse regions, an assumption is made that inputs to the computation reuse region are sourced from registers. Load and store instructions reference values in memory locations. This is described in more detail with reference to FIGS. 6A–6D below.

FIG. 6A shows software instructions that access an array. Embodiment 600 shows software instructions in an end-user program that include a load instruction. The load instruction occurs when the array access is made shown as "a[i]" in FIG. 6A. In instruction 602, a variable "x" is initialized to zero. Instruction 604 is the beginning of a "for" loop, and instruction 608 is the end of the "for" loop. Instruction 606 is executed "M" times within the "for" loop.

Instruction 606 can be a good reuse instruction if a small number of top location-values account for a majority of the memory loads. For example, if the array "a" is invariant, each time a particular location within the array is accessed, the value retrieved will be the same. The method and apparatus of the present invention collects top memory locations and top load values as a set. The load location and loaded value is treated as a combined location-value, and the combined location-values are profiled to collect the top location-values for each candidate load or store instruction. At each candidate load instruction, a fixed number of location-values are collected. For example, in some embodiments, 20 location-values are collected for each candidate load instruction.

FIG. 6B shows a location-value in accordance with one embodiment of the present invention. Location-value 610 shows location 612 concatenated with value 614. Value 614 is the value loaded from location 612. The combination of location 612 and value 614 represent a location-value to be profiled. The concatenation of location 612 and value 614 is similar to the concatenation of values in set-value 300 (FIG. 3A).

FIG. 6C shows a location-value in accordance with another embodiment of the invention. FIG. 6C shows location-value 370 generated as a function of location 612 and value 614. Location 612 is shown having three segments. Each segment represents a portion of the total data word that represents the location, such as a single byte in a three byte word. Segments of location 612 are folded using exclusive-or operator 616. Likewise, segments of value 614 are folded using exclusive-or operator 618. The output of exclusive-or operators 616 and 618 are concatenated to produce location-value 620. Location-value 620 represents the combination of the location and the value accessed by a candidate load instruction.

Location-value 620 may not be unique for each possible combination of locations 612 and values 614. For example, two different combinations of locations and values may produce the same location-value 620. This can decrease the accuracy of the resulting profile generated; however, the degraded accuracy is traded for increased storage efficiency. In practice, most profiled values are small, and the likelihood that two profiled location-values will result in the same location-value 620 is small. For example, if each of location 612 and value 614 have non-zero values only in the left-most segment, then no data is lost as a result of the exclusive-or operations, and each location-value will be unique.

Location-value 620 is shown in FIG. 6C as being generated using exclusive-or operators. One skilled in the art will understand that other mechanisms exist for combining locations and values into location-value 620. When exclusive-or operators or other mechanisms are employed, locations and values are combined into a single value, shown as location-value 620 in FIG. 6C.

In some embodiments, exclusive-or operators 616 and 618 are implemented in hardware. In some hardware implementations, registers internal to a processor drive exclusive-or circuits that create location-values, such as location-value 620. In other embodiments, exclusive-or operators 616 and 618 are implemented in software. In some software implementations, exclusive-or operators 616 and 618 appear as exclusive-or machine instructions inserted into the software as instrumenting code.

FIG. 6D shows a location-value profiling data structure. Profiling data structure 650 shows location-values 652 and profile indicators 654 arranged in records. Record 656 corresponds to location-value "A," and record 658 corresponds to location-value "B." As is the case with profiling data structure 400 (FIG. 4), profile indicators 654 hold the number of times a particular location-value 652 is encountered, and total field 660 includes the total number of times location-values are sampled. When a small number of top location-values represent a large percentage of the location-values for a candidate load instruction, then the candidate load instruction can be good for computation reuse. In some embodiments, the probability of occurrence of a fixed number of top location-values is compared to a threshold, and if the occurrence probability is higher, the candidate load instruction is selected for inclusion in a computation reuse region.

Figure 7:
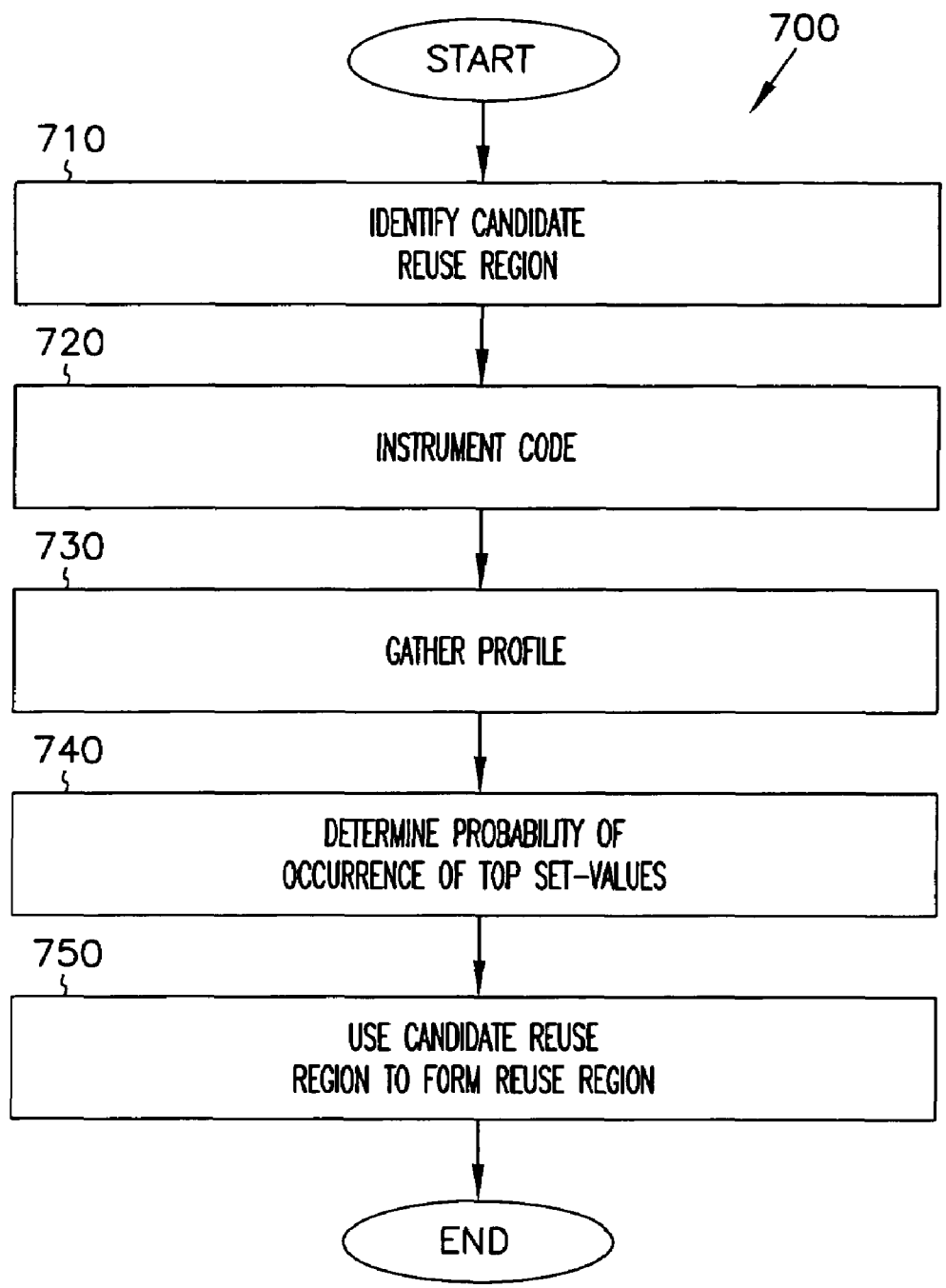
FIG. 7 shows a flowchart for a method of selecting reuse regions.

FIG. 7 shows a flowchart for a method of selecting reuse regions. Method 700 begins with action 710 when a candidate reuse region is identified within a software program. Candidate reuse regions can be identified using any of a number of criteria. One such candidate reuse region is shown as candidate reuse region 100 in FIG. 1.

In action 720, the software program code is instrumented for profiling. Instrumenting for profiling includes inserting instructions in the program that profile top set-values and top location-values. In some embodiments, every time a candidate reuse region is encountered, the instrumented code profiles a set-value for the candidate reuse region. In other embodiments, a sampling filter is employed, such as filter 504 (FIG. 5A), and only one of every "S" set-values is profiled.

In action 730, the instrumented code is executed and the profile data is gathered. As a result, profiling data structures, such as profiling data structure 400 (FIG. 4), and profiling data structure 650 (FIG. 6D) are generated. In action 740, the probability of occurrence of a top set-value is determined as the ratio of the number of times the top set-value was collected to the total number of times set-values were sampled. When a small number of top set-values represent a large percentage of the execution of the candidate reuse region, then the candidate reuse region will likely make for a good computation reuse region.

In action 750, the candidate reuse region is used to form a computation reuse region if appropriate criteria are met. One such criteria is when the probability of occurrence of a small number of top set-values exceeds a threshold. A candidate reuse region can be used by itself or can be combined with other candidate reuse regions to form a computation reuse region.

Figure 8:
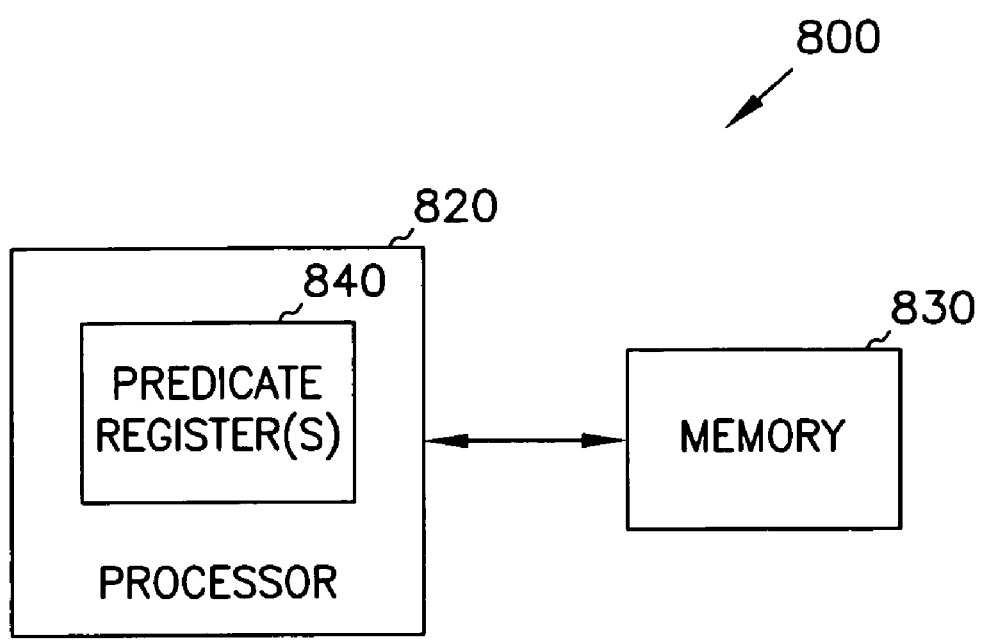
FIG. 8 shows a processing system.

FIG. 8 shows a processing system. Processing system 800 includes processor 820 and memory 830. In some embodiments, processor 820 is a processor capable of executing instrumented software for profiling top set-values and top location-values. Processor 820 can also be a processor capable of selecting good computation reuse regions from candidate reuse regions. Processing system 800 can be a personal computer (PC), mainframe, handheld device, portable computer, set-top box, or any other system that includes software. In some embodiments, the processor includes one or more predicate registers 840.

In some embodiments, processor 820 includes cache memory, a memory controller, or a combination of the two. In these embodiments, processor 820 may access a profile indicator data structure without accessing memory 830. In other embodiments, profile indicators are maintained within memory 830, and processor 820 accesses memory 830 when updating profile indicators regardless of whether processor 820 includes cache memory or memory controllers.

Memory 830 can be a random access memory (RAM), read only memory (ROM), flash memory, hard disk, floppy disk, CDROM, or any other type of machine medium readable by processor 820. Memory 830 can store instructions for performing the execution of the various method embodiments of the present invention.

CONCLUSION

A software profiling mechanism that gathers and profiles top set-values and top location-values has been described. Software to be profiled is instrumented with instructions that sample set-values at the occurrence of candidate reuse regions and sample location-values at the occurrence of candidate load instructions. Set-values and location-values can be generated as concatenated values, or can be combined using mechanisms such as exclusive-or operators. When a small number of top set-values account for a large percentage of occurrences, the candidate reuse region may make a good computation reuse region. Likewise, when a small number of top location-values account for a large percentage of occurrences of candidate load instructions, the candidate load instruction may make a good candidate for inclusion in a computation reuse region.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   identifying a candidate reuse region of a software program;
   determining an input set for the candidate reuse region, wherein the input set includes a plurality of input registers for storing input values of the candidate reuse region;
   instrumenting the software program to, when executed, sample set-values for the input set, wherein each set-value includes an input register value for each of the plurality of input registers;
   executing the instrumented software;
   tracking, during the execution, a number of times a set-value is encountered; and
   selecting, based on the tracking, the candidate reuse region as a computation reuse region.

2. The computer-implemented method of claim 1 wherein the input-set comprises a plurality of input registers, and each set-value comprises an input register value for each of the plurality of input registers, and wherein the instrumenting of the software program includes,
   inserting combine instructions into the software program, the combine instructions which, when executed, will combine each of the input register values into a single value; and
   inserting index instructions into the software program, the index instructions which, when executed, will index into a data structure of profile indicators using the single value.

3. The computer implemented method of claim 1, wherein the instrumenting of the software program includes inserting profile instructions to profile the top N occurring set-values, where N is based on a function of an expected number of reuse instances.

4. A machine readable medium including instructions, which when executed by a machine, cause the machine to perform operations according to the computer implemented method of claim 1.

5. The machine readable medium of claim 4, wherein, during the execution, the sampling is performed every S occurrences of the set-values, and wherein S is an integer greater than 1.

6. The machine readable medium of claim 4 further including instructions, which when executed by a machine, cause the machine to, for each set-value, combine each of the input register values into a single value.

7. The computer implemented method of claim 1, wherein during the execution, the sampling is performed every S occurrences of the set-values, and wherein S is an integer greater than 1.

8. The computer implemented method of claim 1 further comprising, for each set-value, combining each of the input register values into a single value.

9. The computer-implemented method of claim 8, wherein the combining of each of the input register values into a single value includes:
   folding each of the input register values to create folded values; and
   concatenating the folded values.

10. A computer-implemented method comprising:
   determining whether a software program region is a computation reuse region, wherein the determining includes,
   periodically sampling a set of registers to obtain register values, wherein the register values are input values of the software program region;
   combining the register values into a single set-value;
   determining an occurrence frequency of the single set-value; and
   storing the occurrence frequency and the single set-value in a data structure;
   basing the determination of whether the software program region is the computation reuse region on the occurrence frequency.

11. The computer-implemented method of claim 10, wherein the periodically sampling of the set of registers includes sampling ones of the set of registers to obtain a set-value every S occurrences of the software program region, wherein S is a sampling period, wherein S is greater than 1, and wherein S is chosen so that a statistically valid number of registers are sampled.

12. The computer-implemented method of claim 11 further comprising:
   identifying a group of control equivalent candidate region entries and candidate load instructions;
   inserting predicate instructions prior to ones of the group, wherein the predicate instructions set a predicate register every S occurrences; and
   inserting profiling instructions at each of the control equivalent candidate region entries and candidate load instructions, wherein the profiling instructions are predicated on the predicate register.

13. The computer-implemented method of claim 11, wherein the storing includes,
   accessing a record in the data structure as a function of the set-value; and
   incrementing a profile indicator associated with the record.

14. The computer-implemented method of claim 11, wherein the periodically sampling of the set of registers further includes sampling, at the beginning of a candidate reuse region, set-values in ones of the set of registers, the plurality of registers being input registers to the candidate reuse region.

15. A computer-implemented method comprising:
   identifying a candidate load instruction in a software program;
   instrumenting the software program to, when executed, sample a location-value every S occurrences of the candidate load instruction, wherein S is an integer greater than 1;
   storing an occurrence frequency of the location-value into a data structure; and
   executing the software program.

16. The computer-implemented method of claim 15, wherein the instrumenting of the software program includes,
   inserting count instructions in the software program to count a number of times the location-value is sampled; and
   inserting track instructions in the software program to keep track of top location-values.

17. The computer-implemented method of claim 16 wherein the candidate region includes a plurality of candidate load instructions, each of the plurality of load instructions being predicated on a common predicate register.

18. The computer-implemented method of claim 16, wherein the inserting of the track instructions to keep track of top location-values includes inserting sampling instructions configured to profile the top N occurrences of location-values, where N is an integer.

19. The computer-implemented method of claim 15 further comprising:
   identifying a group of control equivalent candidate region entries and candidate load instructions in the software program;
   inserting predicate instructions in the software program prior to ones of the group, wherein the predicate instructions set a predicate register every S occurrences; and
   inserting profiling instructions in the software program at each of the control equivalent candidate region entries and candidate load instructions, wherein the profiling instructions are predicated on the predicated register.

20. A machine readable medium including instructions, which when executed by a machine, cause the machine to perform operations according to the computer implemented method of claim 15.

21. The machine readable medium of claim 20, wherein the instrumenting of the software includes inserting count instructions in the software to count a number of times the location-value is encountered.

22. The machine-readable medium of claim 20, wherein the instrumenting of the software includes inserting track instructions in the software program to keep track of top location-values.

23. The computer-implemented method of claim 15, wherein S is chosen so that a statistically valid number of location-values are sampled.

24. A computer-implemented method comprising:
   selecting candidate reuse regions within a software program; and
   selecting reuse regions from the candidate reuse regions, the selecting of the reuse regions including,
   periodically sampling set-values for ones of the candidate reuse regions to produce a probability of occurrence of top set-values, wherein each of the set-values includes values of input registers for one of the candidate reuse regions; and
   basing the selection of the reuse regions on the probability of occurrence of the top set-values.

25. The computer-implemented method of claim 24, wherein sampling the set values includes, representing each set-value as a single value; and accessing a data structure as a function of the single value to modify a profile indicator.

26. The computer-implemented method of claim 25, wherein the data structure is at least as large as a number of expected reuse instances.

27. The computer-implemented method of claim 24, wherein selecting the reuse regions further includes marking as reuse regions those candidate reuse regions having a finite number of set-values that have a probability of occurrence greater than a threshold.

28. A machine readable medium including instructions, which when executed by a machine, cause the machine to perform operations according to the computer implemented method of claim 24.

29. The machine readable medium of claim 28, wherein sampling the set-values includes,
  representing each set-value as a single value; and
  accessing a data structure as a function of the single value to modify a profile indicator.

30. The machine-readable medium of claim 28 further including instructions, which when executed by a machine, cause the machine to
  identify a candidate load instruction within the candidate reuse region; and
  instrument the software to profile location-values for the candidate load instruction.

31. An apparatus comprising:
  input registers to store input values of one of a set of candidate reuse regions of a software program; and
  a profiling mechanism to select a computation reuse region from the set of candidate reuse regions, wherein the selecting includes instrumenting the software program to, when executed, obtain set-values of the candidate reuse regions, each of the set-values including values of input registers of one of the set of candidate reuse regions and wherein the computation reuse region is selected based on an occurrence frequency of the set-values.

32. The apparatus of claim 31, wherein the selecting also includes combining values of the input registers of one of the candidate reuse regions into a single value.

33. The apparatus of claim 32, wherein the combining includes folding each of the input register values to create folded values and concatenating the folded values.

* * * * *

UNITED STATES PATENT AND TRADEMARK OFFICE
CERTIFICATE OF CORRECTION

| | | |
|---|---|---|
| PATENT NO. | : 7,100,155 B1 | Page 1 of 1 |
| APPLICATION NO. | : 09/522510 | |
| DATED | : August 29, 2006 | |
| INVENTOR(S) | : Wu | |

It is certified that error appears in the above-identified patent and that said Letters Patent is hereby corrected as shown below:

On the title page, item (56), under "Other Publications", in column 2, line 13, delete "Internatinal" and insert -- International --, therefor.

In column 10, line 31, in Claim 2, after "claim 1" insert -- , --.

In column 12, line 3, in Claim 17, after "claim 16" insert -- , --.

In column 12, line 53, in Claim 25, delete "set values" and insert -- set-values --, therefor.

Signed and Sealed this

Twenty-second Day of July, 2008

JON W. DUDAS
*Director of the United States Patent and Trademark Office*